(12) United States Patent
Deshmukh et al.

(10) Patent No.: US 11,173,483 B2
(45) Date of Patent: Nov. 16, 2021

(54) REGENERATION OF CATALYST

(71) Applicant: Velocys Technologies Ltd, Harwell (GB)

(72) Inventors: Soumitra R. Deshmukh, Houston, TX (US); Ivan Philip Greager, Houston, TX (US); Roger Allen Harris, Houston, TX (US); Heinz Robota, Plain City, OH (US)

(73) Assignee: VELOCYS TECHNOLOGIES LIMITED, Harwell (GB)

( * ) Notice: Subject to any disclaimer, the term of this patent is extended or adjusted under 35 U.S.C. 154(b) by 0 days.

(21) Appl. No.: 16/892,490

(22) Filed: Jun. 4, 2020

(65) Prior Publication Data

US 2020/0391195 A1    Dec. 17, 2020

Related U.S. Application Data

(60) Provisional application No. 62/861,089, filed on Jun. 13, 2019.

(51) Int. Cl.
*B01J 38/18* (2006.01)
*B01J 23/94* (2006.01)
(Continued)

(52) U.S. Cl.
CPC ............ *B01J 38/18* (2013.01); *B01J 19/248* (2013.01); *B01J 23/745* (2013.01); *B01J 23/75* (2013.01);
(Continued)

(58) Field of Classification Search
CPC ...... C10G 2/332; C10G 2300/70; B01J 38/18; B01J 23/94; B01J 23/75; B01J 19/248; B01J 23/745; B01J 3/04; B01J 2219/3221; B01J 2219/182; B01J 2219/1943; B01J 38/12
See application file for complete search history.

(56) References Cited

U.S. PATENT DOCUMENTS

2010/0304955 A1   12/2010   Van de Loosdrecht et al.
2011/0245355 A1   10/2011   Van de Loosdrecht et al.

FOREIGN PATENT DOCUMENTS

CN   101 703 937   5/2012
CN   107 952 495   4/2018
(Continued)

OTHER PUBLICATIONS

Chaopeng et al (CN 107952495A machine translation), Apr. 2018.*
(Continued)

*Primary Examiner* — Jafar F Parsa
(74) *Attorney, Agent, or Firm* — Ping Wang; Morris, Manning & Martin LLP

(57) ABSTRACT

A catalyst is regenerated by an inventive process using a heat exchange fluid such as superheated steam to remove heat during the process relying on efficient heat transfer (e.g., enabled by the microchannel reactor construction) in comparison with prior art heat exchange relying on a phase change, e.g. between water and (partial or complete vaporization) steam, allows simplification of the protocols to enable transition at higher temperatures between steps which translates in reduced duration of the regeneration process and avoids potential water hammering risks.

22 Claims, 3 Drawing Sheets

(51) Int. Cl.
  *B01J 23/75* (2006.01)
  *B01J 19/24* (2006.01)
  *C10G 2/00* (2006.01)
  *B01J 23/745* (2006.01)
(52) U.S. Cl.
  CPC .............. *B01J 23/94* (2013.01); *C10G 2/332* (2013.01); *C10G 2300/70* (2013.01)

(56) References Cited

FOREIGN PATENT DOCUMENTS

| CN | 109201074 | 1/2019 |
| WO | 2016201218 | 12/2016 |

OTHER PUBLICATIONS

Chaopeng et al (CN 109209074A machine translation), Jan. 2019.*
International Search Report and Written Opinion of International Application No. PCT/EP2020/065883 dated Aug. 31, 2020.

* cited by examiner

REGENERATION OF CATALYST

This application claims benefit to U.S. Provisional Application No. 62/861,089, filed Jun. 13, 2019. The entirety of the aforementioned applications is incorporated herein by reference.

FIELD

The present application relates to a process for the regeneration of a catalyst, for example a Fischer-Tropsch (FT) catalyst.

BACKGROUND

The Fischer-Tropsch process is widely used to generate fuels from carbon monoxide and hydrogen and can be represented by the equation:

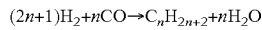

$$(2n+1)H_2 + nCO \rightarrow C_nH_{2n+2} + nH_2O$$

This reaction is highly exothermic and is catalysed by a Fischer-Tropsch catalyst, typically a cobalt-based catalyst, under conditions of elevated temperature (typically at least 180° C., e.g. 200° C. or above) and pressure (e.g. at least 10 bar). A product mixture is obtained, and n typically encompasses a range from 10 to 120. It is desirable to minimise light gas (e.g. methane) selectivity, i.e. the proportion of methane (n=1) in the product mixture, and to maximise the selectivity towards C5 and higher (n≥5) paraffins, typically to a level of 85% or higher. It is also desirable to maximise the conversion of carbon monoxide.

The hydrogen and carbon monoxide feedstock is normally synthesis gas.

The synthesis gas may be produced by gasifying a carbonaceous material at an elevated temperature, for example, about 700° C. or higher. The carbonaceous material may comprise any carbon-containing material that can be gasified to produce synthesis gas. The carbonaceous material may comprise biomass (e.g., plant or animal matter, biodegradable waste, and the like), a food resource (e.g., as corn, soybean, and the like), and/or a non-food resource such as coal (e.g., low grade coal, high grade coal, clean coal, and the like), oil (e.g., crude oil, heavy oil, tar sand oil, shale oil, and the like), solid waste (e.g., municipal solid waste, hazardous waste), refuse derived fuel (RDF), tires, petroleum coke, trash, garbage, biogas, sewage sludge, animal waste, agricultural waste (e.g., corn stover, switch grass, grass clippings), construction demolition materials, plastic materials (e.g., plastic waste), cotton gin waste, a mixture of two or more thereof, and the like.

Alternatively, synthesis gas may be produced by other means such as by reformation of natural or landfill gas, or of gases produced by anaerobic digestion processes. Also synthesis gas may be produced by CO2 reforming using electrolysis as a hydrogen source (e.g. so called "electricity-to-fuels" processes).

The synthesis gas, produced as described above, may be treated to adjust the molar ratio of H2 to CO by steam reforming (eg, a steam methane reforming (SMR) reaction where methane is reacted with steam in the presence of a steam methane reforming (SMR) catalyst); partial oxidation; autothermal reforming; carbon dioxide reforming; or a combination of two or more thereof in preparation for feeding the Fischer-Tropsch catalyst (referred to as fresh synthesis gas below).

The molar ratio of $H_2$ to CO in the fresh synthesis gas is desirably in the range from about 1.6:1 to about 2.2:1, or from about 1.8:1 to about 2.10:1, or from about 1.95:1 to about 2.05:1.

The fresh synthesis gas may optionally be combined with a recycled tail gas (e.g. a recycled FT tail gas), which also contains $H_2$ and CO, to form a reactant mixture. The tail gas may optionally comprise $H_2$ and CO with a molar ratio of $H_2$ to CO in the range from about 0.5:1 to about 2:1, or from about 0.6:1 to about 1.8:1, or from about 0.7:1 to about 1.2:1.

The combined FT synthesis gas feed (comprising of fresh synthesis gas combined with recycled tailgas) desirably comprises H2 and CO in a molar ratio in the range from about 1.4:1 to about 2.1:1, or from about 1.7:1 to about 2.0:1, or from about 1.7:1 to about 1.9:1.

When the recycled tail gas is used, the volumetric ratio of fresh synthesis gas to recycled tail gas used to form the reactant mixture may for example be in the range from about 1:1 to about 20:1, or from about 1:1 to about 10:1, or from about 1:1 to about 6:1, or from about 1:1 to about 4:1, or from about 3:2 to about 7:3, or about 2:1.

During the Fischer-Tropsch reaction, the catalyst is gradually degraded, decreasing its effectiveness and requiring a gradual increase in temperature to maintain acceptable carbon monoxide conversion. This is described in Steynberg et al. "Fischer-Tropsch catalyst deactivation in commercial microchannel reactor operation" Catalysis Today 299 (2018) pp 10-13.

Eventually it becomes necessary to regenerate the catalyst in order to restore its effectiveness. It is known to regenerate the catalyst in situ.

A number of different reactor types are known for carrying out Fischer-Tropsch synthesis, including fixed bed reactors, slurry bubble-column reactors (SBCR) and microchannel reactors (Rytter et al, "Deactivation and Regeneration of Commercial Type Fischer-Tropsch Co-Catalysts—A Mini-Review" *Catalysts* 2015, 5, pp 478-499 at pp 482-483).

Microchannel reactors are disclosed in WO 2016/201218A, in the name of the present applicant, which is incorporated by reference, and similarly in LeViness et al "Velocys Fischer-Tropsch Synthesis Technology—New Advances on State-of-the-Art" Top Catal 2014 57 pp 518-525. Such reactors have the particular advantage that very effective heat removal is possible, owing to the high ratio of heat exchange surface area to microchannel (and hence catalyst) volume.

However, as stated at page 490 para 2 lines 6 and 7 of Rytter et al (ibid):

"Microchannel reactors pose special challenges depending on the catalyst configuration. In situ regeneration is an option, or the catalyst can be removed for external treatment either by unloading the catalyst particles or removing multichannel trays with catalyst attached."

The present invention is concerned with in situ catalyst regeneration in microchannel reactors.

It is known eg from WO 2016/201218A Example 6 to regenerate Fischer-Tropsch catalyst in a microchannel reactor by a three stage process involving de-waxing with hydrogen at 350° C. to 375° C., oxidation beginning with air introduction by cooling to 70° C., and then reduction with hydrogen at about 350° C.

The heating and cooling is provided over the entire range of temperatures through the use of circulating cooling water as well as superheated steam. The transitions from cooling water circulation to superheated steam and vice versa, typically performed in the 150° C.-200° C. range, can be potentially problematic with a chance of water hammering of the reactor/steam drum if correct procedures are not followed, leading to equipment damage resulting in downtime and repair costs.

In the above process it has been considered necessary to cool the reactor to about 70° C. to avoid a large exotherm from the reaction of the catalyst with oxygen and to eliminate the potential for reaction between hydrogen and oxygen (with improper purging in between steps). However this increases the duration of the regeneration process, since the rate of cooling and heating is limited.

An object of the present invention is to overcome or alleviate the above disadvantages of the prior art.

SUMMARY

Accordingly, in a first aspect the present invention provides a process for regeneration of a catalyst in situ in a reactor, preferably a microchannel reactor, provided with heat exchange channels, the process comprising:
  a) de-waxing the catalyst by treating it at an elevated temperature with a hydrogen containing de-waxing gas stream flowing through process microchannels of the reactor;
  b) oxidising the resulting de-waxed catalyst by treating it at an elevated temperature with an oxidising gas stream flowing through process microchannels of the reactor, and
  c) reducing the resulting oxidised catalyst by treating it at an elevated temperature with a reducing gas stream flowing through process microchannels of the reactor, wherein:
  in the transition from step a) to step b) the temperature inside the process microchannels and/or the heat exchange channels is lowered from a temperature sufficient for de-waxing to a first lower limit value of 90° C. or greater, preferably 100° C. or greater, more preferably 140° C. to 180° C., most preferably 145° C. to 155° C.;
  in step b) the temperature inside the process microchannels and/or the heat exchange channels is raised to a temperature sufficient to oxidise the catalyst;
  in the transition from step b) to step c) the temperature inside the process microchannels and/or the heat exchange channels is lowered from a temperature sufficient for oxidation to a first lower limit value of 90° C. or greater, preferably 100° C. or greater, more preferably 140° C. to 180° C., most preferably 145° C. to 155° C.;
  and in step c) the temperature inside the process microchannels and/or the heat exchange channels is then raised to a value sufficient to reduce the catalyst;
  the temperature inside the process microchannels and/or the heat exchange channels being controlled by heat exchange fluid flowing through the heat exchange channels of the microchannel reactor without the whole of the heat exchange fluid undergoing a phase change.

In a preferred aspect the heat exchange fluid as a whole undergoes no phase change in the process of the invention. However, the inventive process may also be realised when the heat exchange fluid comprises multiple phases, only one of which undergoes no phase change in the operation of the inventive process. For example, the heat exchange fluid may comprise only superheated steam—in which case no phase change occurs in the heat exchange fluid during the inventive process. This aspect of the invention is exemplified below in Example 5. Alternatively the heat exchange fluid may comprise saturated steam (a mixture of steam and water), in which case only one part of the heat exchange fluid (the steam) undergoes no phase change during the invention process. This latter aspect is exemplified below in Example 6.

The process according to the invention may suitably be used for the regeneration of catalyst in situ in any number of chemical processes which require catalyst regeneration by dewaxing, oxidation and reduction. Fischer-Tropsch is one such chemical process.

In a second aspect the present invention provides a process for regeneration of a catalyst in situ in a reactor, preferably a microchannel reactor, provided with heat exchange channels, the process comprising:
  x) oxidising the catalyst by treating it at an elevated temperature with an oxidising gas stream flowing through process microchannels of the reactor, and
  y) reducing the resulting oxidised catalyst by treating it at an elevated temperature with a reducing gas stream flowing through process microchannels of the reactor, wherein:
  in step x) the temperature inside the process microchannels and/or the heat exchange channels is raised to a temperature sufficient to oxidise the catalyst;
  in the transition from step x) to step y) the temperature inside the process microchannels and/or the heat exchange channels is lowered from a temperature sufficient for oxidation to a first lower limit value of 90° C. or greater, preferably 100° C. or greater, more preferably 140° C. to 180° C., most preferably 145° C. to 155° C.;
  and in step y) the temperature inside the process microchannels and/or the heat exchange channels is then raised to a value sufficient to reduce the catalyst;
  the temperature inside the process microchannels and/or the heat exchange channels being controlled by heat exchange fluid flowing through the heat exchange channels of the microchannel reactor without the whole of the heat exchange fluid undergoing a phase change.

The process according to the invention may suitably be used for the regeneration of catalyst in situ in any number of chemical processes which require catalyst regeneration by oxidation and reduction. Methanol synthesis is one such chemical process. Others may include oxidative regeneration of hydroprocessing catalysts, methanation of carbon monoxide to produce synthetic natural gas, redox regeneration of Fischer-Tropsch catalyst wherein the dewaxing step is performed by physical means such as solvent extraction.

Preferably the heat exchange fluid is steam.

Preferably the catalyst is a metal based catalyst, for example a Fischer-Tropsch catalyst, such as a cobalt or iron-containing catalyst. In the following description preferred temperatures of de-waxing, oxidation and reduction are indicated for cobalt-based Fischer-Tropsch catalysts, but it will be appreciated that different types of catalyst may require alternative temperatures to be used, the selection of which is well within the remit of the skilled addressee.

Preferably the catalyst is disposed on a porous support.

Preferably the oxidising gas stream comprises oxygen and a non-oxidising diluent gas. Preferably the oxygen content of the oxidising gas stream is 21% or less by volume, preferably 15% or less by volume, more preferably 10% or less, even more preferably 5% or less, most preferably 1% to 4%. This feature minimises the risk of uncontrolled exothermic reaction during the oxidation step.

The temperature of the gas stream is controlled by heat exchange fluid flowing through the heat exchange channels of the microchannel reactor. Preferably the heat exchange fluid is steam.

In a preferred embodiment, step a) is initiated upon cool-down of the reactor from synthesis (eg FT synthesis) mode to a transition temperature of approximately 170° C. for an optional nitrogen purge and the introduction of the hydrogen containing gas. Hydrogenolysis occurs during this step leading to the formation of light hydrocarbons from the residual hydrocarbons in the catalyst bed. The gas environment is maintained at a concentration of greater than 75% hydrogen, preferably 80% to 90% hydrogen in the reducing gas.

Preferably the de-waxing gas stream comprises hydrogen and optionally a diluent gas. The diluent gas may for example comprise (or be) nitrogen, methane or light hydrocarbons.

It is recommended that the heat-up under the hydrogen containing gas be initiated with the liquid water flow in the coolant circuit (as during a Fischer-Tropsch synthesis mode) up to the maximum temperature allowed by the medium pressure steam header. At this point, a cool-down would typically be initiated to the lowest temperature where superheated steam is available, generally in the range of 140° C. to 180° C., more preferably 145° C. to 155° C., for the transition from liquid water to steam (vapor) flow in the coolant circuit.

With the steam flow established, in a preferred embodiment the temperature of the catalyst bed/reactor/hydrogen containing gas stream is raised to a holding temperature of 300° C. to 400° C., preferably 330° C. to 380° C., most preferably 340° C. to 360° C. and kept at or near (preferably within 15° C. of) that holding temperature for a period of one hour to 24 hours, preferably 10 to 20 hours, more preferably 10 to 15 hours.

Upon completion of step a) the temperature of the catalyst bed/reactor/gas stream is preferably lowered from the dewaxing temperature to the lowest temperature where superheated steam is available, generally in the range of 140° C. to 180° C., more preferably 145° C. to 155° C., for an inert gas (eg nitrogen) purge and the subsequent introduction of the oxidising gas. This feature minimises the time needed for regeneration and the risk of water hammering of the reactor or any associated steam drum and piping.

After completion of the dewaxing step, a purge with an inert gas (e.g. nitrogen) is completed prior to the introduction of the oxidising gas in step b).

Preferably the oxidising gas stream comprises oxygen and a diluent gas. Preferably the oxygen content of the oxidising gas stream is 21% or less by volume, preferably 15% or less by volume, more preferably 10% or less, even more preferably 5% or less, most preferably 1% to 4%. This feature minimises the risk of uncontrolled exothermic reaction during the oxidation step at the elevated temperatures with superheated steam flow in coolant channels.

The diluent gas may for example comprise (or be) air, nitrogen, argon, helium or carbon dioxide.

Preferably in step b) the temperature of the catalyst bed/reactor/oxidising gas stream is raised to a temperature of 250° C. to 325° C., more preferably 280° C. to 300° C. at which the catalyst is fully oxidized. The temperature of the final hold is preferably kept at or near (preferably within 15° C. of) that holding temperature for a period of one hour to 24 hours, preferably 10 to 20 hours, more preferably 10 to 15 hours. Upon completion of the hold, the temperature is then preferably lowered to the lowest temperature where superheated steam is available, generally in the range of 140° C. to 180° C., more preferably 145° C. to 155° C. This feature minimises the time needed for regeneration.

Preferably, after completion of the oxidation step, a purge with an inert gas (e.g. nitrogen) is completed prior to the introduction of the reducing gas in step c).

Preferably in step c) the temperature of the reducing gas stream is raised to a holding temperature of 300° C. to 400° C., preferably 330° C. to 380° C., most preferably 340° C. to 360° C. and kept at or near (preferably within 15° C. of) that holding temperature for a period of one hour to 24 hours, preferably 10 to 20 hours, more preferably 10 to 15 hours.

Preferably the reducing gas stream comprises hydrogen and optionally a diluent gas. The diluent gas may for example comprise (or be) nitrogen, methane, light hydrocarbons, carbon dioxide or carbon monoxide.

Preferably the temperature of the oxidising gas stream in step b) or step x) or the temperature of the reducing gas stream in step a) or step c) or step y) is changed (raised or lowered) at a rate of 5° C. to 30° C. per hour, preferably 10° C. to 20° C. per hour, most preferably 12° C. to 18° C. per hour.

Preferably the temperature within the process microchannels is within 10° C., preferably 5° C., more preferably 2° C., most preferably 1° C. of the temperature within the adjacent heat-transfer channels. This feature minimises the risk of uncontrolled reaction of the catalyst.

Preferably the maximum internal transverse dimension of the process microchannels is 12 mm or less, preferably 5 mm or less, more preferably 2 mm or less, most preferably 1 mm or less. These ranges maximise heat transfer and thereby minimise the risk of uncontrolled reaction of the catalyst.

The invention also provides, in a second aspect, a Fischer-Tropsch process comprising reacting a gas mixture comprising carbon monoxide and hydrogen in a Fischer-Tropsch reactor and periodically regenerating the catalyst in that Fischer-Tropsch reactor by a process as defined above.

Preferably said gas mixture flows in parallel flow paths though a plurality of Fischer-Tropsch reactors or through a plurality of Fischer-Tropsch reactor cores of one or more Fischer-Tropsch reactors and said flow paths are isolated in cyclical fashion, and said de-waxing, oxidising and reducing gas streams of steps a), b) and c) are fed successively through said isolated flow paths to regenerate the Fischer-Tropsch catalyst of those flow paths simultaneously with the Fischer-Tropsch reaction occurring in the remaining flow paths. This feature enables continuous production and avoids down-time of the plant.

In a preferred embodiment said synthesis gas mixture is generated by gasifying biomass and/or municipal or solid waste products and optionally subsequent reforming. Other feedstocks such as landfill gas or natural gas may be reformed directly without prior gasification.

The invention also provides, in a third aspect, a process in accordance with the above for regeneration of cobalt containing or iron containing or ruthenium containing Fischer-Tropsch catalyst in situ in a microchannel reactor provided with heat exchange channels.

The invention also provides, in a fourth aspect, a process in accordance with the above for regeneration of a hydrocarbon processing catalyst in situ in a microchannel reactor provided with heat exchange channels.

The invention also provides, in a fifth aspect, a regeneration process of any catalyst with at least one treatment in a hydrogen containing process stream and one treatment in oxygen containing process stream. For example certain chemical processes may not require a dewaxing stage; others may achieve dewaxing through physical means such as solvent extraction—in which case the regeneration may then be completed with oxidation and reduction steps in accordance with the invention. For example a methanol synthesis catalyst may be regenerated with oxidation and reduction steps x) and y) according to the invention.

BRIEF DESCRIPTION OF THE DRAWINGS

Preferred embodiments of the invention are described below by way of example only with reference to FIGS. 1 to 7 of the accompanying drawings, wherein.

Figure 5:
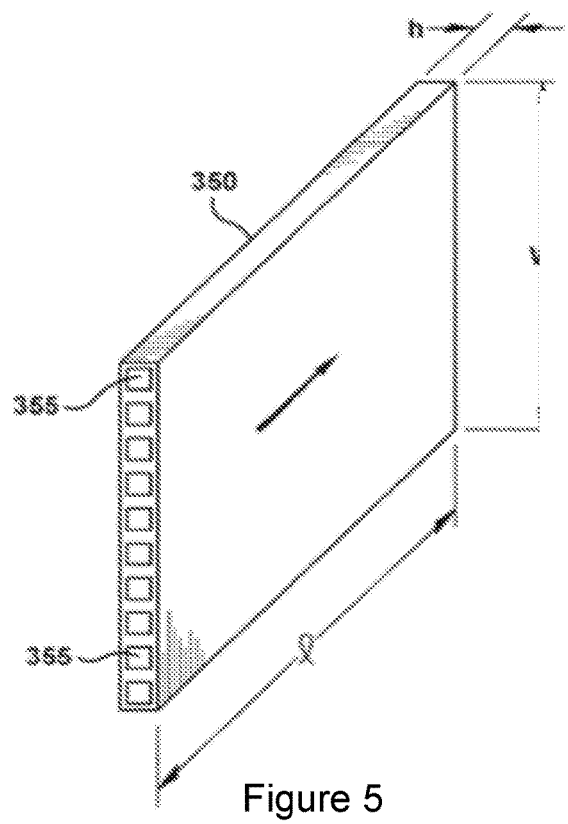
FIG. 5 is a diagrammatic view of a heat exchange unit utilised in the reactor core of FIG. 4.
Figure 6:
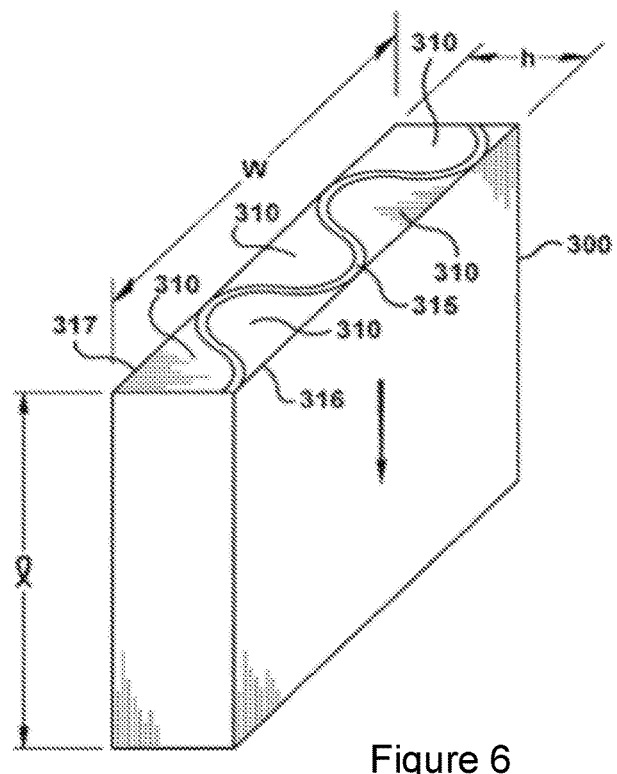
FIG. 6 is a diagrammatic view of a catalyst unit comprising process microchannels, the catalyst unit being utilised in the reactor core of FIG. 4.

A microchannel reactor comprising two process layers (each comprising approximately 500 process channels per layer as shown in FIG. 6) and three coolant layers (comprising approximately 175 channels per layer as shown in FIG. 5) was employed. The reactor was loaded with a cobalt based FT catalyst and was operated in a FT synthesis mode for a period of 815 hours on synthesis gas derived from natural gas (using a steam reforming process) and adjusted to an approximate $H_2$:CO ratio of 1.75 using a membrane. It was then subjected to a regeneration (WROR) process comprising of wax removal, oxidation and reduction steps as summarized in FIG. 1.

Figure 1:
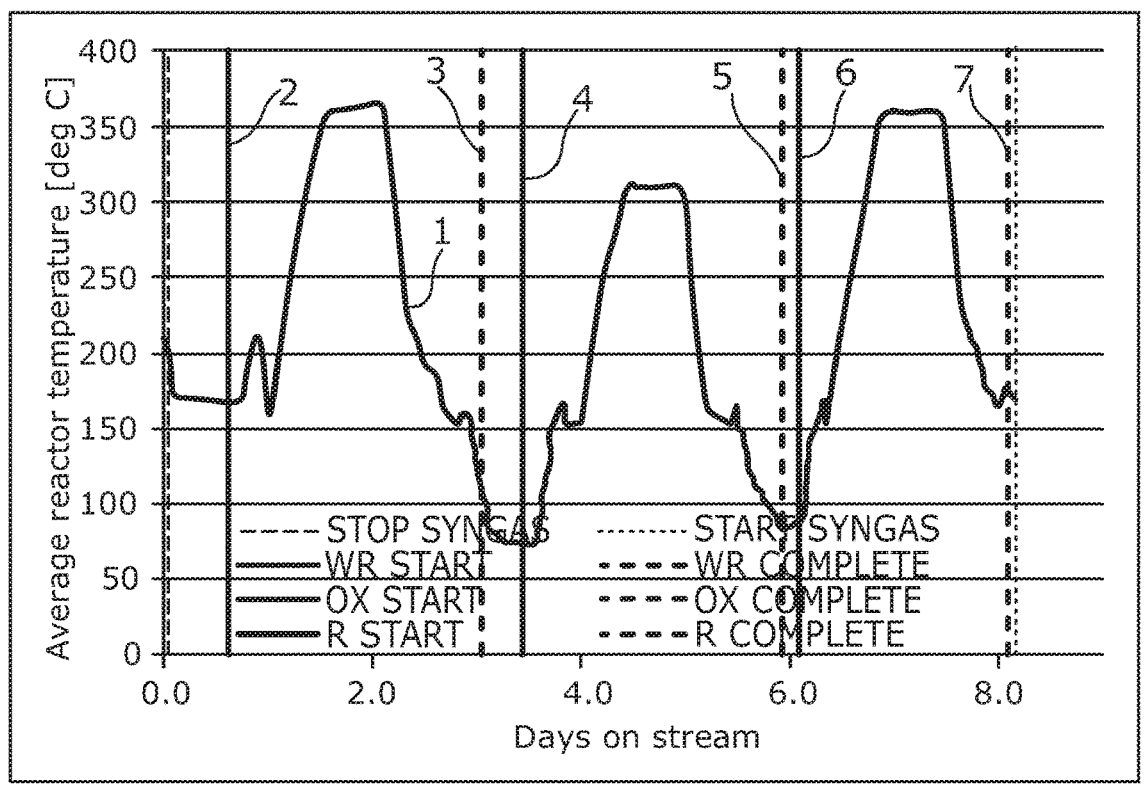
FIG. 1 is a temperature plot during a catalyst regeneration process using a heat exchange fluid under conditions of heat transfer involving a transition from a liquid phase to a vapor phase or vice versa in the heat exchange fluid (i.e. a conventional process)

FIG. 1 shows a temperature plot of the regeneration process of the above cobalt-based Fischer-Tropsch catalyst in the above-described microchannel reactor involving cooling with water and steam as the heat exchange fluid (i.e. involving a phase change and consequent heat removal as latent heat).

As shown, a three-step process is involved, and comprises wax removal, oxidation and reduction (WROR) phases, and requires heat-up and cool-down of the catalyst bed (in a reactor) in each phase.

Initially the synthesis is stopped by lowering the reactor temperature to approximately 170° C. and then synthesis gas is cut off (STOP SYNGAS). This is followed by a purge with nitrogen and then with hydrogen to establish the environment for the wax removal step. The temperature ramps for the wax removal are the initiated between WR START, 2, and WR COMPLETE, 3. The initial heat-up is performed with an active liquid coolant flow to a temperature of about 210° C. The reactor is then cooled down to approximately 170° C. and the cooling medium is switched to superheated steam and the heat-up, hold and cool-down continued as per the profile shown in FIG. 1. Upon cool-down to approximately 150° C., the liquid coolant medium (water) is reintroduced and the reactor cooled to approximately 70° C. This is followed by a purge with nitrogen and a gradual controlled introduction of the oxidizing gas beginning at OX START, 4 and then increasing the oxygen concentration in the system in steps of 1%. Once the final environment is reached, the oxidation temperature ramp begins and is terminated by OX COMPLETE, 5. Once again, during the heat-up stage a transition is made from the liquid water coolant to superheated steam coolant around a temperature of 150° C. and the reverse transition from superheated steam to liquid coolant made around the same temperature. Upon completion of the oxidation temperature ramps, the reactor is at approximately 70° C. under an oxygen containing gas. This is followed by a purge with nitrogen and then with hydrogen to establish the environment for the reduction step. The third, reduction phase temperature ramp begins with R START, 6 and is terminated at R COMPLETE, 7 when the hydrogen feed is cut off. Once again, during the heat-up stage a transition is made from the liquid water coolant to superheated steam coolant around a temperature of 150° C. and the reverse transition from superheated steam to liquid coolant made around the synthesis start temperature of approximately 170° C. The regeneration is then complete and the synthesis gas is re-started (START SYNGAS).

The recovery of the catalyst activity after this comparative protocol is illustrated in Table 1 below:

TABLE 1

Performance comparison following a comparative WROR in Velocys pilot reactor.

| | 1st Period* (3d average ± σ) | 2nd Period* (2d average ± σ) |
|---|---|---|
| Average Reactor Surface Temp (° C.) | 202.6 ± 0.5 | 201.8 ± 0.1 |
| FT Feed Temperature (° C.) | 201.4 ± 0.2 | 199.8 ± 0.1 |
| Coolant Inlet Temperature (° C.) | 197.6 ± 0.6 | 197.5 ± 0.1 |
| Coolant Temperature (° C.) | 202.3 ± 0.6 | 202.2 ± 0.1 |
| Coolant Flow (kg/h) | 762.4 ± 1.9 | 755.9 ± 0.2 |
| Coolant dP (psi) | 14.8 ± 0.1 | 14.8 ± 0.0 |
| Process Inlet Pressure (psig) | 357.1 ± 0.0 | 357.1 ± 0.0 |
| FTR Feed $H_2$:CO | 1.73 ± 0.02 | 1.73 ± 0.01 |
| FT Feed Inerts (%) | 30.9 ± 0.3 | 31.1 ± 0.2 |
| Contact Time (ms) | 287 ± 0.9 | 286 ± 1.0 |
| CO Conversion (%) | 69.7 ± 1.1 | 68.8 ± 0.4 |
| $CH_4$ Selectivity (%) | 5.1 ± 0.8 | 5.4 ± 0.3 |
| $C_5^+$ Selectivity (%) | 90.3 ± 1.0 | 89.6 ± 0.8 |

*1st Period: indicates the beginning of a first synthesis period of 815 hours as described above.
*2nd Period: indicates the beginning of second synthesis period following regeneration of the catalyst at the end of the first synthesis period.

There is a risk of exothermic reactions in each of these phases stemming from exothermicity of the reactions, hydrogenolysis in the wax removal step (mild) and cobalt oxidation in the oxidation step (high) as well as the potential for reaction between hydrogen and oxygen (with improper purging in between steps). In order to mitigate these risks, the transitions between each of these steps are performed at approximately 70-80° C. while the final hold temperatures in these steps are often in the range of 300-375° C. Providing heating and cooling over the entire range of temperatures involves the use of circulating cooling water as well as superheated steam. The transitions from cooling water circulation to superheated steam and vice versa are typically performed in the 150-200° C. range and can subject the reactor/steam drum to potential water hammering.

Figure 2:
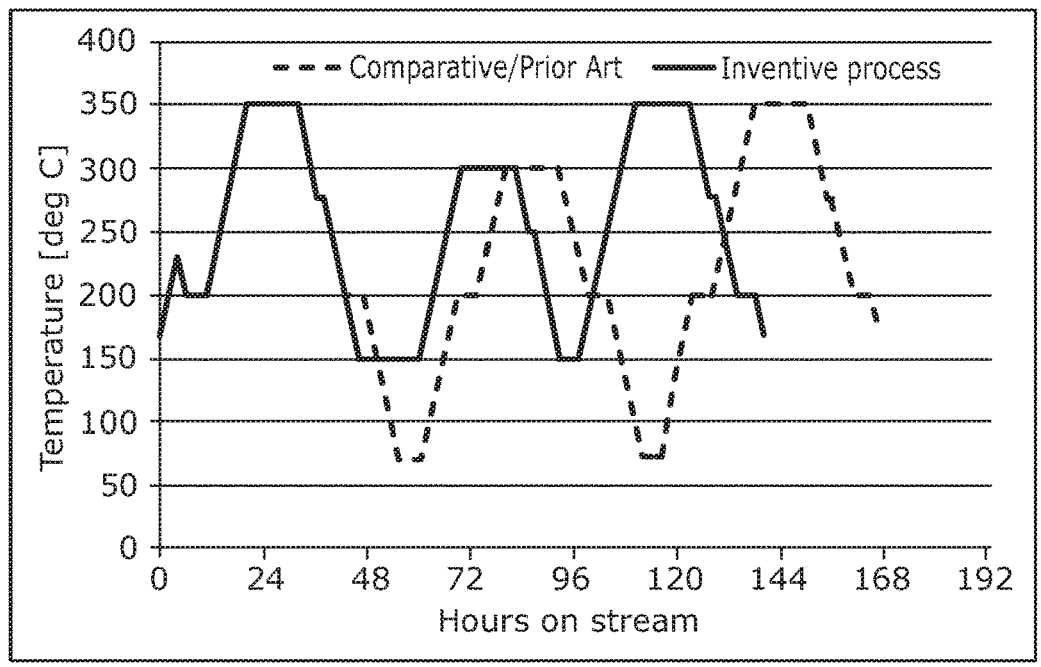
FIG. 2 is a schematic comparative temperature plot illustrating a catalyst regeneration process in accordance with the invention and in accordance with the process of FIG. 1.

FIG. 2 shows an idealized version of the same temperature profile as FIG. 1 as plot 1 but also shows a temperature plot 10 achievable in accordance with the invention for a cobalt-based Fischer-Tropsch catalyst in an identical microchannel reactor. In this case the heat exchange medium that can be used is superheated steam. The lowest temperature that the superheated steam can be available at is 150° C. and as a result the transition between the steps occurs at 150° C. rather than 70° C. The rates of heating and cooling for plots 1 and 10 were essentially identical at 15° C./hr. It will be seen that the process of the invention as illustrated in plot 10 reduces the time spent in WROR (Wax Removal Oxidation Reduction) by approximately 24 hrs (1 day) out of the 7 day original process. Assuming a regeneration every 60 days or ~6 per year, the process of the invention reduces the time spent in regeneration by ~6 days or increases the availability of the Fischer-Tropsch reactor by approximately 2%.

The results of testing of the individual components of the inventive process are described below:

The wax removal parts of temperature plots 1 and 10 are essentially identical. Thus, no modification is necessary for the execution of the wax removal protocol.

EXAMPLES 1-2 (CONCERNING OXIDATION)

Oxidation step in the regeneration is the most sensitive to the rate of introduction of oxygen. The increase in O2 introduction temperature from ~70-80° C. to 150° C. is expected to increase the reactivity (for the cobalt re-oxidation reaction) and is investigated for heat release at initial O2 introduction.

A single channel kilopocket reactor was used to test the modified O2 introduction protocol. At the initial O2 introduction, a thermal response (measured as a temperature spike in the reactor wall thermocouple(s) located in the center of the wall between the process and coolant channels) and catalyst bed pressure drop were used as indicators to assess a successful air introduction.

Fresh cobalt based Fischer-Tropsch catalyst was first activated by reducing in hydrogen, held at a temperature of 150° C. and then O2 was introduced.

Table 2 summarizes the results of the O2 introduction testing with the inventive protocol at 150° C. which shows good agreement with the comparative protocol in terms of observed maximum temperature rise (as measured by the thermowells described above) and pressure drop change. For a practical implementation, the quantity of O2 available needs to be tuned and controlled through change in concentration (illustrated) or flow (not shown) depending on the size of the process channel in order to deliver the correct quantity of O2 needed. A moving front heat release model of a repeating unit (single process and single coolant layer) was used to assess the thermal impact of the oxygen introduction step using detailed mechanical analysis performed per ASME Section VIII Division 2 to verify an acceptable fatigue life (>1000 thermal cycles) for the reactor.

TABLE 2

Comparison of $O_2$ introduction testing.

| Procedure | Process channel | T (° C.) | Max $O_2$ | Outlet Pressure | Max T increase (° C.) | Relative dP change |
|---|---|---|---|---|---|---|
| Comparative | 0.95 mm | 80 | 3.0% | 15 psig | 2.5 | −12.3% |
| Example 1 | 0.95 mm | 150 | 3.0% | 15 psig | 2.6 | −11.7% |
| Example 2 | 1.5 mm | 150 | 1.5% | 15 psig | 2.3 | −12.7% |

The maximum temperature increase and the pressure drop displayed in the Examples is within 5% of the comparative value and within the instrumental measurement uncertainty. Performance is therefore comparable but with significantly lower regeneration times and less risk of water hammering.

EXAMPLES 3-4 (CONCERNING REDUCTION)

The reduction of the catalyst was investigated for a starting temperature of 150° C. A single channel kilopocket reactor was used to test a modified reduction protocol following wax removal and oxidation steps to confirm acceptable performance.

In order to expedite the testing, a catalyst that had previously undergone synthesis and WROR operations was employed for this test. The catalyst was activated per target protocols, comparative and modified for the activation per the inventive protocol and then FT synthesis started up at operating conditions corresponding to H2:CO=1.82, 41% inerts, 2.41 MPa (350 psig) inlet pressure and 356 ms contact time. The reactor temperature was initially set to 201° C. and subsequently increased in order to target 75±1% CO conversion. Each protocol was tested in triplicate and it was found that the performance of the catalysts activated by the comparative and the modified protocol was statistically indistinguishable.

Cobalt based FT catalyst, that had undergone synthesis operation previously followed by wax removal and oxidation treatments, was activated by reducing in hydrogen and synthesis gas introduced. The reactor temperature was set to 201° C. and CO conversion compared @24 hours on stream. Then the reactor temperature was increased to account for catalyst deactivation and maintain approximately 75±0.5% CO conversion @between 48 and 72 hours on stream.

Table 3 summarizes the results of the FT synthesis performance. The comparative protocol and the inventive protocol are statistically indistinguishable.

TABLE 3

Comparison of FT Synthesis performance.

| Procedure | CO Conversion @201° C. 24 hrs on stream | Reactor Temperature @target conversion 2-3 days on stream (° C.) |
|---|---|---|
| Comparative* | 72.7 ± 1.3% | 203.7 ± 1.1 |
| Example 1* | 72.2 ± 1.6% | 204.5 ± 0.9 |

*average of three trials – standard deviations given in Columns 2 and 3

Performance is, therefore, comparable but with significantly lower regeneration times and less risk of water hammering.

EXAMPLE 5 (CONCERNING THE OVERALL PROCESS)

An example of the detailed regeneration protocol for the cobalt based FT catalyst as executed as a multi-step process of the wax removal, oxidation and reduction phases is as follows:

Wax Removal

A reducing gas flow is set to the target flows and the $H_2$ purity at the FTR inlet is targeted to be >85 mol %. The reactor is pressurized to the target pressure and heated up from 170° C. to 350° C. at a rate of ≤15° C./hr. Upon completing heat-up to a temperature of approximately 220° C., the transition is made from liquid water flow to superheated steam as the coolant medium and the heat-up to hold temperature re-initiated. Once the target hold temperature is reached, the reducing environment is maintained at the constant temperature for a period of 12 hrs and then cooled down to the target transition temperature of 150° C. at a rate of ≤15° C./hr.

Oxidation

Prior to the start of the oxidation process, the reactor should be free from combustible gases (e.g. $H_2$ used during wax removal) by purging with nitrogen. This can be achieved via pressurization-depressurization cycles or a purge with $N_2$. Note that during the air used for the oxidation process should have a dew point of −40° F., <0.1 ppmw particulates and should essentially be free of S and N contaminants.

The nitrogen gas flow is set to the target flows and the reactor is pressurized to the target pressure. While maintaining the total flow rate (GHSV), introduce small amount of air to increase the oxygen concentration to ~0.1 mol % and hold for a pre-defined period of time. Continue air introduction to increase the oxygen concentration in steps, e.g. of 0.1% (with or without holds), to final target oxygen concentration (e.g., of approximately 3 mol %). After the final O2 concentration is reached, initiate the heat-up of the reactor from the temperature of 150° C. to 300° C. at a rate of ≤15° C./hr. After completing a hold for a period of 12 hrs, initiate a cool-down of the reactor from 300° C. to 150° C. at a rate of ≤15° C./hr. Purge the reactor with nitrogen in preparation for the final reduction step.

Reduction

A long initial purge with $H_2$ is initially performed for a period of 4 hours at the transition temperature of 150° C. A reducing gas flow is set to the target flows and the $H_2$ purity at the FTR inlet is targeted to be >99.6 mol %. The reactor is pressurized to the target pressure and heated up from 150° C. to 350° C. at ≤15° C./hr, followed by a 12 hr hold at 350° C. and a final cool-down to syngas introduction temperature of ~170° C. at a rate of ≤15° C./hr. At this state the switch is made from superheated steam to liquid water as the cooling medium in preparation for FT synthesis.

EXAMPLE 6 (CONCERNING THE OVERALL PROCESS)

The cool-down of the reactor/catalyst/heat exchange to 70° C. in the comparative process, in commercial practice, involves two steps—from final hold temperatures for each of the steps with superheated steam heat exchange medium to saturated steam temperature (where the steam drum pressure controls the temperature in the steam drum based on saturation steam curve). In order to cool below this temperature to the target temperature of 70° C. in the comparative process, requires additional flushing down of the steam drum with fresh water make-up and blowdown of the same or waiting for an extended period of time to allow for the temperature to cool-down by natural convection. In the process described by FIG. 1 above, the target rates of cool-down were achieved through a combination of steam drum make up—blow down as described above and the use of removable insulation. In commercial practice, one may find that a process that utilizes the inventive process to a lesser extent, example of the transition temperature being about 99-105° C. (steam saturation temperature based on the operation of the steam drum ~2 psi above ambient pressure), can achieve the target benefits of the inventive process.

An example of the detailed regeneration protocol for the cobalt based FT catalyst as executed as a multi-step process of the wax removal, oxidation and reduction phases as described in example 5 but with the transition temperature being the lowest temperature achievable (based on saturated steam pressure given the site climatic conditions—operating the steam drum ~2 psi above ambient pressure), say 99-105° C.

Details of a suitable microchannel reactor are given below with reference to FIGS. 3 to 6.

Figure 3:
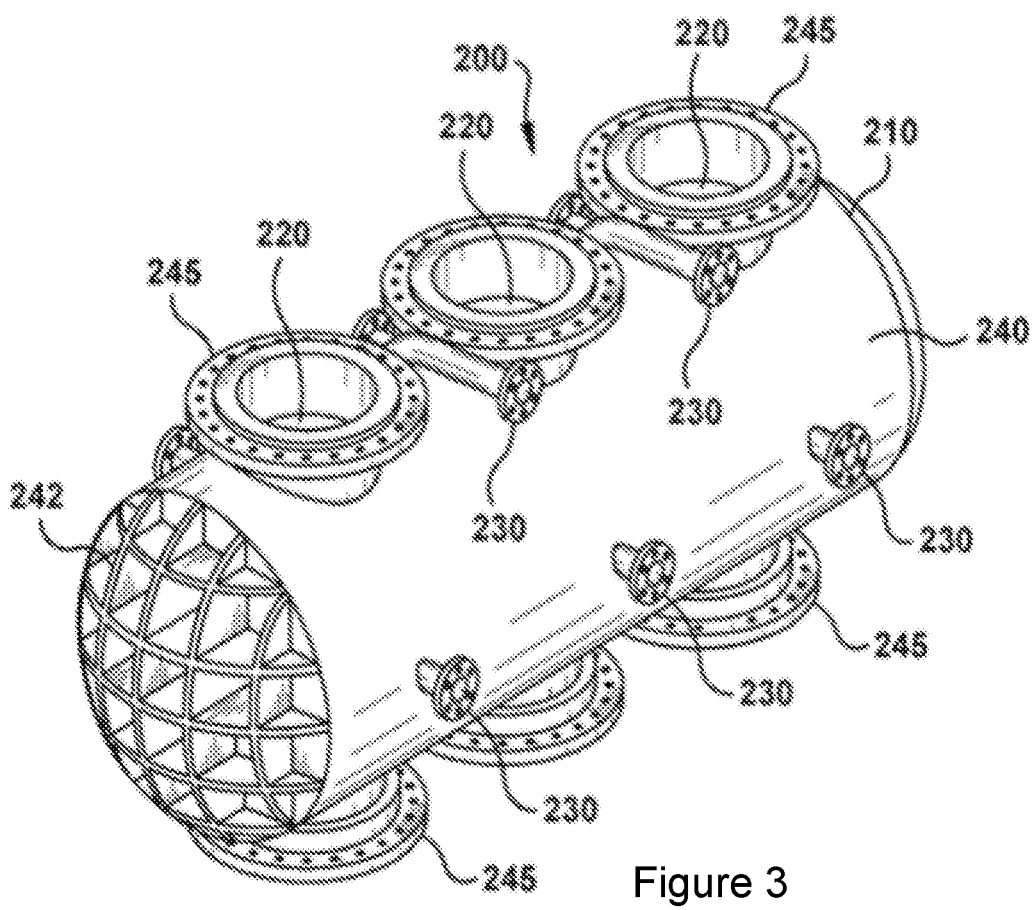
FIG. 3 is a diagrammatic view of a microchannel reactor used in a preferred embodiment.

Referring to FIG. 3, microchannel reactor 200 comprises containment vessel 210 which contains or houses three microchannel reactor cores 220. In other embodiments, containment vessel 210 may be used to contain or house from 1 to about 12 microchannel reactor cores, or from 1 to about 8 microchannel reactor cores, or from 1 to about 4 microchannel reactor cores. The containment vessel 210 may be a pressurizable vessel. The containment vessel 210 includes inlets and outlets 230 allowing for the flow of reactants into the microchannel reactor cores 220, product out of the microchannel reactor cores 220, and heat exchange fluid into and out of the microchannel reactor cores 220.

One of the inlets 245 may be connected to a header or manifold (not shown) which is provided for flowing reactants to process microchannels in each of the microchannel reactor cores 220. One of the inlets 230 is connected to a header or manifold (not shown) which is provided for flowing a heat exchange fluid, eg superheated steam, to heat exchange channels in each of the microchannel reactor cores 220. One of the outlets 245 is connected to a manifold or footer (not shown) which provides for product flowing out of the process microchannels in each of the microchannel reactor cores 220. One of the outlets 230 is connected to a manifold or footer (not shown) to provide for the flow of the heat exchange fluid out of the heat exchange channels in each of the microchannel reactor cores 220.

The containment vessel 210 may be constructed using any suitable material sufficient for countering operating pressures that may develop within the microchannel reactor cores 220. For example, the shell 240 and reinforcing ribs 242 of the containment vessel 210 may be constructed of cast steel. The flanges 245, couplings and pipes may be constructed of 316 stainless steel for example.

Figure 4:
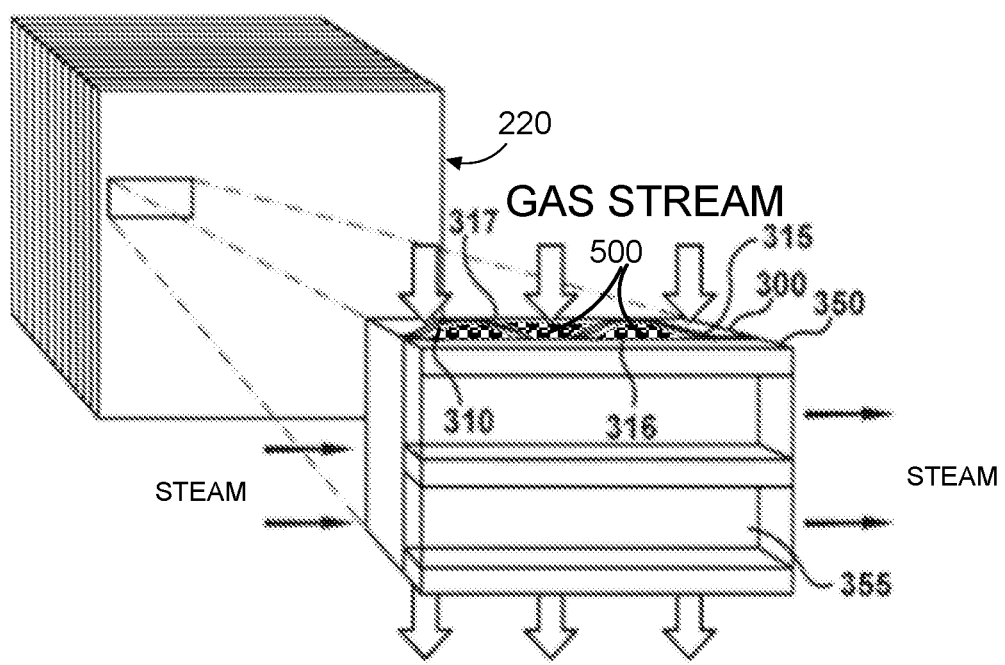
FIG. 4 is a diagrammatic view of a reactor core utilised in the reactor of FIG. 3.

Referring to FIGS. 4, 5 and 6, the microchannel reactor core 220 contains a stack of alternating laminar units 300 of process microchannels 310 and laminar units 350 of heat exchange channels 355.

The microchannel reactor core 220 may optionally comprise a plurality of plates in a stack defining a plurality of process layers and a plurality of heat exchange layers, each plate having a peripheral edge, the peripheral edge of each plate or shim being welded to the peripheral edge of the next adjacent plate to provide a perimeter seal for the stack. This is shown in US 2012/0095268 A1, which is incorporated herein by reference.

The microchannel reactor core 220 may optionally have the form of a three-dimensional block which has six faces that are squares or rectangles. The microchannel reactor core 220 may optionally have the same cross-section along a length. The microchannel reactor core 220 may optionally be in the form of a parallel or cubic block or prism.

Fischer-Tropsch catalyst 500 is positioned in the process microchannels 310 and may be in any form including fixed beds of particulate solids or various structured catalyst forms.

FIG. 4 shows a corrugated sheet 315 sandwiched between plates 316 and 317 and defining process microchannels 310 on either side of sheet 315. For the sake of clarity, Fischer-Tropsch catalyst 500 is shown in only three of these microchannels, but in practice each microchannel 310 will be packed with catalyst 500. Further details of the construction are disclosed in WO 2008/030467A, which is incorporated herein by reference The Fischer-Tropsch catalyst 500 may optionally comprise cobalt and a support. The catalyst may optionally have a Co loading in the range from about 10 to about 60% by weight, or from about 15 to about 60% by weight, or from about 20 to about 60% by weight, or from about 25 to about 60% by weight, or from about 30 to about 60% by weight, or from about 32 to about 60% by weight, or from about 35 to about 60% by weight, or from about 38 to about 60% by weight, or from about 40 to about 60% by weight, or from about 40 to about 55% by weight, or about 40 to about 50% of cobalt.

The Fischer-Tropsch catalyst 500 may optionally further comprise a noble metal. The noble support metal may be one or more of Pd, Pt, Rh, Ru, Re, Ir, Au, Ag and Os. The noble metal may be one or more of Pd, Pt, Rh, Ru, Ir, Au, Ag and Os. The noble metal may be one or more of Pt, Ru and Re. The noble metal may be Ru. As an alternative, or in addition, the noble metal may be Pt. The Fischer-Tropsch catalyst may optionally comprise from about 0.01 to about 30% in total of noble metal(s) (based on the total weight of all noble metals present as a percentage of the total weight of the catalyst precursor or activated catalyst), or from about 0.05 to about 20% in total of noble metal(s), or from about 0.1 to about 5% in total of noble metal(s), or about 0.2% in total of noble metal(s).

The Fischer-Tropsch catalyst 500 may optionally include one or more other metal-based components as promoters or modifiers. These metal-based components may optionally also be present in the catalyst precursor and/or activated catalyst as carbides, oxides or elemental metals. A suitable metal for the one or more other metal-based components may for example be one or more of Zr, Ti, V, Cr, Mn, Ni, Cu, Zn, Nb, Mo, Tc, Cd, Hf, Ta, W, Re, Hg, Tl and the 4f-block lanthanides. Suitable 4f-block lanthanides may be La, Ce, Pr, Nd, Pm, Sm, Eu, Gd, Tb, Dy, Ho, Er, Tm, Yb and/or Lu. The metal for the one or more other metal-based components may for example be one or more of Zn, Cu, Mn, Mo and W. The metal for the one or more other metal-based components may for example be one or more of Re and Pt. The catalyst may optionally comprise from about 0.01 to about 10% in total of other metal(s) (based on the total weight of all the other metals as a percentage of the total weight of the catalyst precursor or activated catalyst), or optionally from about 0.1 to about 5% in total of other metals, or optionally about 3% in total of other metals.

The Fischer-Tropsch catalyst 500 may optionally be derived from a catalyst precursor which may be activated to produce the Fischer-Tropsch catalyst, for instance by heating the catalyst precursor in hydrogen and/or a hydrocarbon gas (e.g., methane), or in a hydrogen or hydrocarbon gas diluted with another gas, such as nitrogen and/or methane, to convert at least some of the carbides or oxides to elemental metal. In the active catalyst, the cobalt may optionally be at least partially in the form of its carbide or oxide.

The Fischer-Tropsch catalyst precursor may optionally be activated using a carboxylic acid as the reducing agent. The carboxylic acid may be chosen such that it minimizes the fracturing of the catalyst precursor whilst still ultimately producing an effective catalyst. A mixture of two or more carboxylic acids may be used. The carboxylic acid may be an alpha-hydroxy carboxylic acid, such as citric acid, glycolic acid, lactic acid, mandelic acid, or a mixture of two or more thereof.

The Fischer-Tropsch catalyst 500 may optionally include a catalyst support. The support may optionally comprise a refractory metal oxide, carbide, carbon, nitride, or mixture of two or more thereof. The support may optionally comprise alumina, zirconia, silica, titania, or a mixture of two or more thereof. The surface of the support may optionally be modified by treating it with silica, titania, zirconia, magnesia, chromia, alumina, or a mixture of two or more thereof. The material used for the support and the material used for modifying the support may be different. The support may optionally comprise silica and the surface of the silica may be treated with an oxide refractory solid oxide such as titania. The material used to modify the support may be used to increase the stability (e.g. by decreasing deactivation) of the supported catalyst. The catalyst support may optionally comprise up to about 30% by weight of the oxide (e.g., silica, titania, magnesia, chromia, alumina, or a mixture of two or more thereof) used to modify the surface of the support, or from about 1% to about 30% by weight, or from about 5% to about 30% by weight, or from about 5% to about 25% by weight, or from about 10% to about 20% by weight, or from about 12% to about 18% by weight, for example. The catalyst support may optionally be in the form of a structured shape, pellets or a powder. The catalyst support may optionally be in the form of particulate solids. While not wishing to be bound by theory, it is believed that the surface treatment provided for herein helps keep the Co from sintering during operation of the Fischer-Tropsch process.

The deactivation rate of the Fischer-Tropsch catalyst 500 may optionally be such that it can be used in a Fischer-Tropsch synthesis for more than about 300 hours, or more than about 3,000 hours, or more than about 12,000 hours, or more than about 15,000 hours, all before a catalyst rejuvenation or regeneration is required.

The Fischer-Tropsch catalyst 500 may optionally be used for an extended period (e.g. >300 hours) with a deactivation rate of less than about 1.4% per day, or less than about 1.2% per day, or between about 0.1% and about 1% per day, or between about 0.03 and about 0.15% per day.

The Fischer-Tropsch catalyst 500 may have any size and geometric configuration that fits within the process microchannels 310. The catalyst may optionally be in the form of particulate solids (e.g., pellets, powder, fibers, and the like) having a median particle diameter of about 1 to about 1000 µm (microns), or about 10 to about 750 µm, or about 25 to about 500 µm. The median particle diameter may optionally be in the range from 50 to about 500 µm or about 100 to about 500 µm, or about 125 to about 400 µm, or about 170 to about 300 μm. In one embodiment, the catalyst may be in the form of a fixed bed of particulate solids.

The microchannel reactor core 220 may for example contain six layers 350 of heat exchange channels 355.

Referring to FIG. 6, each unit 300 of process microchannels 310 may for example have a have a height (h) of 6.35 mm and a width (w) of 165 mm. The length of each process microchannel may for example be 600 mm.

Referring to FIG. 5, each unit 350 of heat exchange channels 355 may for example have a height (h) of 6.35 mm, a width (w) of 6.35 mm and a length (l) of 600 mm.

Each unit 300 of process microchannels 310 may for example have 165 process microchannels 310. The process microchannels 310 may have cross sections having any shape, for example, square, rectangle, circle, semi-circle, etc. The internal height of each process microchannel 310 may be considered to be the smaller of the internal dimensions normal to the direction of flow of reactants and product through the process microchannel. Each of the process microchannels 310 may for example have an internal height of 6.35 mm and a width of 1 mm.

Each unit 350 of heat exchange channels 355 may for example have 168 heat exchange channels. The heat exchange channels 355 may be microchannels or they may have larger dimensions that would classify them as not being microchannels. Each of the heat exchange channels 355 may for example have internal height or width of 6.35 mm.

The microchannel reactor core 220 may be made of any material that provides sufficient strength, dimensional stability and heat transfer characteristics to permit operation of the desired process. These materials may for example include aluminum; titanium; nickel; platinum; rhodium; copper; chromium; alloys of any of the foregoing metals; brass; steel (e.g., stainless steel); quartz; silicon; or a combination of two or more thereof. Each microchannel reactor may be constructed of stainless steel with one or more copper or aluminum waveforms being used for forming the channels.

The microchannel reactor core 220 may be fabricated using known techniques including for example wire electrodischarge machining, conventional machining, laser cutting, photochemical machining, electrochemical machining, molding, water jet, stamping, etching (for example, chemical, photochemical or plasma etching) and combinations thereof.

The microchannel reactor core 220 may optionally be constructed by forming plates with portions removed that allow flow passage. A stack of plates may for example be assembled via diffusion bonding, laser welding, diffusion brazing, and similar methods to form an integrated device. The microchannel reactors may for example be assembled using a combination of plates and partial plates or strips. In this method, the channels or void areas may be formed by assembling strips or partial plates to reduce the amount of material required.

The microchannel reactor core 220 may optionally comprise a plurality of plates in a stack defining a plurality of process layers and a plurality of heat exchange layers, each plate having a peripheral edge, the peripheral edge of each plate or shim being welded to the peripheral edge of the next adjacent plate to provide a perimeter seal for the stack. This is shown in US 2012/0095268 A1, which is incorporated herein by reference.

The containment vessel 210 may optionally include a control mechanism to maintain the pressure within the containment vessel at a level that is at least as high as the internal pressure within the microchannel reactor cores 220.

The internal pressure within the containment vessel 210 may optionally be in the range from about 10 to about 60 atmospheres, or from about 15 to about 30 atmospheres during the operation of a synthesis gas conversion process (e.g., Fischer-Tropsch process). The control mechanism for maintaining pressure within the containment vessel may optionally comprise a check valve and/or a pressure regulator. The check valve or regulator may optionally be programmed to activate at any desired internal pressure for the containment vessel. Either or both of these may be used in combination with a system of pipes, valves, controllers, and the like, to ensure that the pressure in the containment vessel 210 is maintained at a level that is at least as high as the internal pressure within the microchannel reactor cores 220. This is done in part to protect welds used to form the microchannel cores 220. A significant decrease in the pressure within the containment vessel 210 without a corresponding decrease of the internal pressure within the microchannel reactor cores 220 could result in a costly rupture of the welds within the microchannel reactor cores 220. The control mechanism may optionally be designed to allow for diversion of one or more process gases into the containment vessel in the event the pressure exerted by the containment gas decreases.

The Fischer-Tropsch process microchannels may be characterized by having bulk flow paths. The term "bulk flow path" refers to an open path (contiguous bulk flow region) within the process microchannels. A contiguous bulk flow region allows rapid fluid flow through the channels without large pressure drops. In one embodiment, the flow of fluid in the bulk flow region is laminar. Bulk flow regions within each process microchannel may optionally have a cross-sectional area of about 0.05 to about 10,000 $mm^2$, or about 0.05 to about 5000 $mm^2$, or about 0.1 to about 2500 $mm^2$. The bulk flow regions may optionally comprise from about 5% to about 95%, or about 30% to about 80% of the cross-section of the process microchannels.

The contact time of the reactants with the catalyst may optionally range up to about 3600 milliseconds (ms), or up to about 2000 ms, or in the range from about 10 to about 2600 ms, or from about 10 ms to about 2000 ms, or about 20 ms to about 500 ms, or from about 200 to about 450 ms, or from about 240 to about 350 ms.

The space velocity (or gas hourly space velocity (GHSV)) for the flow of fluid in the process microchannels may optionally be at least about 1000 hr-1 (normal liters of feed/hour/liter of volume within the process microchannels), or at least about 1800 hr-1, or from about 1000 to about 1,000,000 hr-1, or from about 5000 to about 20,000 hr-1.

The pressure within the process microchannels may optionally be up to about 100 atmospheres, or in the range from about 1 to about 100 atmospheres, or from about 1 to about 75 atmospheres, or from about 2 to about 40 atmospheres, or from about 2 to about 10 atmospheres, or from about 10 to about 50 atmospheres, or from about 20 to about 30 atmospheres.

The pressure drop of fluids as they flow in the process microchannels may optionally range up to about 30 atmospheres per meter of length of channel (atm/m), or up to about 25 atm/m, or up to about 20 atm/m. The pressure drop may optionally be in the range from about 10 to about 20 atm/m.

In a preferred embodiment, the reactor has a heat transfer surface (or heat transfer wall) for removing heat of reaction from the reactor (or process microchannel layer) wherein the ratio of the surface area of the heat transfer surface to the volume of the catalyst in the reactor is at least about 300 square meters of heat transfer surface per cubic meter of catalyst, eg from about 300 to about 5000 or preferably about 1000 to 3000 m²/m³ catalyst.

The heat flux for heat exchange in the microchannel reactor core 220 may optionally be in the range from about 0.01 to about 500 watts per square centimeter of surface area of the one or more heat transfer walls of the process microchannels (W/cm2) in the microchannel reactor, or in the range from about 0.1 to about 250 W/cm2, or from about 1 to about 125 W/cm2, or from about 1 to about 100 W/cm2, or from about 1 to about 50 W/cm2, or from about 1 to about 25 W/cm2, or from about 1 to about 10 W/cm2. The range may optionally be from about 0.2 to about 5 W/cm2, or about 0.5 to about 3 W/cm2, or from about 1 to about 2 W/cm2.

Figure 7:
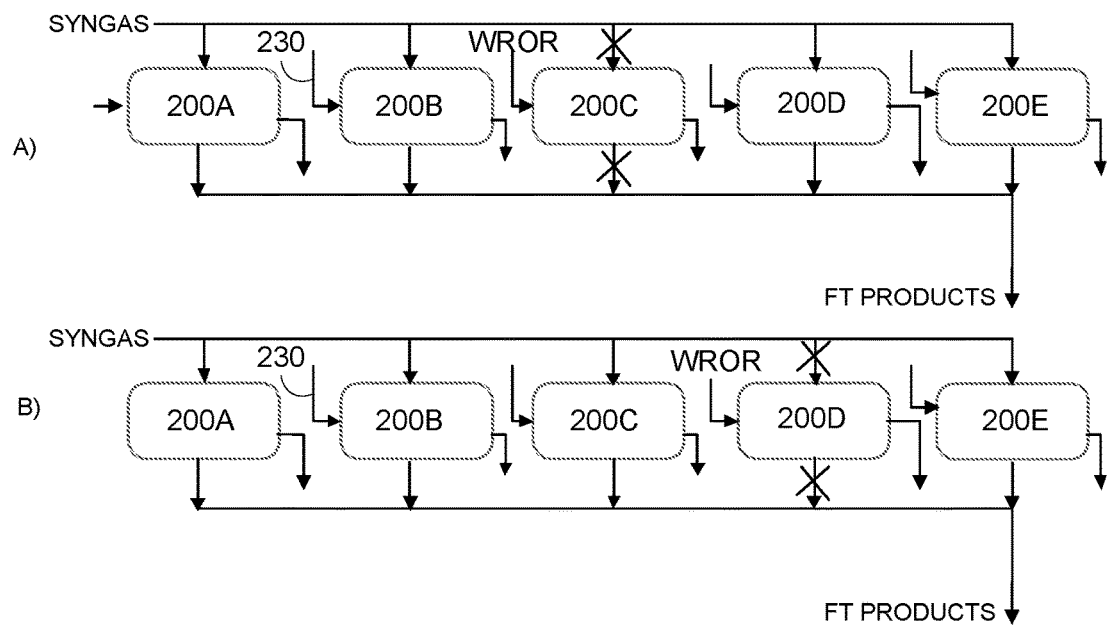
FIG. 7 is a diagrammatic view of a Fischer-Tropsch island (facility) with five different reactor trains (each comprising of one or more microchannel reactors), showing two stages A) and B) in the operation of the reactor train in which different reactor trains 200C and 200D are isolated from the Fischer-Tropsch synthesis process for catalyst regeneration.

Referring to FIG. 7, a chain of microchannel reactors 200A to 200E is shown in two states A) and B). The microchannel reactors are each fed in parallel with synthesis gas (SYNGAS) from a common supply line and the products (FT PRODUCTS) are combined in parallel as shown.

In state A), reactor 200C is isolated and its catalyst regenerated in accordance with the protocol of plot 10 of FIG. 2. When this regeneration is completed it is returned to the Fischer-Tropsch operation by re-starting the flow of SYNGAS and connection to the FT PRODUCTS line, and a similar regeneration is performed for the catalyst of reactor 200D as shown in state B). The regeneration is cycled through each of the reactors 200A to 200D, such that at any time, four of the reactors are being utilised in the Fischer-Tropsch process and the remaining reactor is having its catalyst regenerated.

The superficial velocity for fluid flowing in the process microchannels may optionally be at least about 0.01 meters per second (m/s), or at least about 0.1 m/s, or in the range from about 0.01 to about 100 m/s, or in the range from about 0.01 to about 10 m/s, or in the range from about 0.1 to about 10 m/s, or in the range from about 1 to about 100 m/s, or in the range from about 1 to about 10 m/s.

The free stream velocity for fluid flowing in the process microchannels may optionally be at least about 0.001 m/s, or at least about 0.01 m/s, or in the range from about 0.001 to about 200 m/s, or in the range from about 0.01 to about 100 m/s, or in the range from about 0.01 to about 200 m/s, preferably.

The conversion of CO from the fresh synthesis gas may be optionally about 70% or higher, or about 75% or higher, or about 80% or higher, or about 90% or higher, or about 91% or higher, or about 92% or higher, or from about 88% to about 95%, or from about 90% to about 94%, or from about 91% to about 93%. If a tail gas recycle is used, the one-pass conversion of CO for the CO in the reactant mixture (i.e., fresh synthesis gas plus recycled tail gas) may optionally be in the range from about 50% to about 90%, or from about 60% to about 85%.

The selectivity to methane in the Fischer-Tropsch (FT) product may optionally be in the range from about 0.01 to about 10%, or about 1% to about 5%, or about 1% to about 10%, or about 3% to about 9%, or about 4% to about 8%.

The Fischer-Tropsch product may optionally comprise a gaseous product fraction and a liquid product fraction. The gaseous product fraction may optionally include hydrocarbons boiling below about 350° C. at atmospheric pressure (e.g., tail gases through middle distillates). The liquid product fraction (the condensate fraction) may optionally include hydrocarbons boiling above about 350° C. (e.g., vacuum gas oil through heavy paraffins).

The Fischer-Tropsch product fraction boiling below about 350° C. may optionally be separated into a tail gas fraction and a condensate fraction, e.g., normal paraffins of about 5 to about 20 carbon atoms and higher boiling hydrocarbons, using, for example, a high pressure and/or lower temperature vapor-liquid separator, or low pressure separators or a combination of separators. The fraction boiling above about 350° C. (the condensate fraction) may optionally be separated into a wax fraction boiling in the range of about 350° C. to about 650° C. after removing one or more fractions boiling above about 650° C. The wax fraction may optionally contain linear paraffins of about 20 to about 50 carbon atoms with relatively small amounts of higher boiling branched paraffins. The separation may be effected using fractional distillation.

The Fischer-Tropsch product may optionally include methane, wax and other heavy high molecular weight products. The product may optionally include olefins such as ethylene, normal and iso-paraffins, and combinations thereof. These may optionally include hydrocarbons in the distillate fuel ranges, including the jet or diesel fuel ranges.

Branching may be advantageous in a number of end-uses, particularly when increased octane values and/or decreased pour points are desired. The degree of isomerization may optionally be greater than about 1 mole of isoparaffin per mole of n-paraffin, or about 3 moles of isoparaffin per mole of n-paraffin. When used in a diesel fuel composition, the product may optionally comprise a hydrocarbon mixture having a cetane number of at least about 60.

While various embodiments have been described above, it should be understood that such disclosures have been presented by way of example only and are not limiting. Thus, the breadth and scope of the subject compositions and methods should not be limited by any of the above-described exemplary embodiments. The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations can be included within the scope of the present application as defined by the embodiments described herein.

What is claimed is:

1. A process for regeneration of a catalyst in situ in a microchannel reactor, provided with heat exchange channels, the process comprising:
   a) de-waxing the catalyst by treating it at an elevated temperature with a hydrogen containing de-waxing gas stream flowing through process microchannels of the reactor;
   b) oxidising the resulting de-waxed catalyst by treating it at an elevated temperature with an oxidising gas stream flowing through process microchannels of the reactor, and
   c) reducing the resulting oxidised catalyst by treating it at an elevated temperature with a reducing gas stream flowing through process microchannels of the reactor, wherein:
   in the transition from step a) to step b) the temperature inside the process microchannels and/or the heat exchange channels is lowered from a temperature sufficient for de-waxing to a first lower limit value of 90° C. or greater;
   in step b) the temperature inside the process microchannels and/or the heat exchange channels is raised to a temperature sufficient to oxidise the catalyst;

in the transition from step b) to step c) the temperature inside the process microchannels and/or the heat exchange channels is lowered from a temperature sufficient for oxidation to a first lower limit value of 90° C. or greater;

and in step c) the temperature inside the process microchannels and/or the heat exchange channels is then raised to a value sufficient to reduce the catalyst;

the temperature inside the process microchannels and/or the heat exchange channels being controlled by heat exchange fluid flowing through the heat exchange channels of the microchannel reactor without the whole of the heat exchange fluid undergoing a phase change.

2. The process according to claim 1 wherein step a) is initiated upon cool-down of the reactor from synthesis mode to a transition temperature of approximately 170° C. for an optional nitrogen purge and the introduction of the hydrogen containing gas.

3. The process according to claim 1, wherein in step a) the temperature of the catalyst bed, of the reactor and/or of the dewaxing gas stream is raised to a temperature of 250° C. to 400° C., and kept at or near that holding temperature for a period of one hour to 24 hours.

4. A process for regeneration of a catalyst in situ in a microchannel reactor, provided with heat exchange channels, the process comprising:

x) oxidising the catalyst by treating it at an elevated temperature with an oxidising gas stream flowing through process microchannels of the reactor, and y) reducing the resulting oxidised catalyst by treating it at an elevated temperature with a reducing gas stream flowing through process microchannels of the reactor, wherein:

in step x) the temperature inside the process microchannels and/or the heat exchange channels is raised to a temperature sufficient to oxidise the catalyst;

in the transition from step x) to step y) the temperature inside the process microchannels and/or the heat exchange channels is lowered from a temperature sufficient for oxidation to a first lower limit value of 90° C. or greater;

and in step y) the temperature inside the process microchannels and/or the heat exchange channels is then raised to a value sufficient to reduce the catalyst;

the temperature inside the process microchannels and/or the heat exchange channels being controlled by heat exchange fluid flowing through the heat exchange channels of the microchannel reactor without the whole of the heat exchange fluid undergoing a phase change.

5. A process in accordance with claim 4 for the regeneration of a hydrocarbon processing catalyst in situ in a microchannel reactor provided with heat exchange channels.

6. The process according to claim 1, wherein the heat exchange fluid is steam.

7. The process according to claim 1, wherein the catalyst is a metal based catalyst.

8. The process according to claim 1, wherein the catalyst is disposed on a porous support.

9. The process according to claim 1, wherein the temperature of each gas stream is controlled by heat exchange fluid flowing through the heat exchange channels of the reactor.

10. A process according to claim 1, wherein in step b) the temperature of the catalyst bed, of the reactor and/or of the oxidising gas stream is raised to a temperature of 250° C. to 325° C. at which the catalyst is fully oxidized.

11. A process according to claim 1, wherein in step c) the temperature of the reducing gas stream is raised to a holding temperature of 300° C. to 400° C. and kept at or near that holding temperature for a period of one hour to 24 hours.

12. A Fischer-Tropsch process comprising reacting a gas mixture comprising carbon monoxide and hydrogen in a Fischer-Tropsch reactor and periodically regenerating the catalyst in that Fischer-Tropsch reactor by a process according to claim 1.

13. A process according to claim 1, wherein the heat exchange fluid as a whole undergoes no phase change in the process.

14. A process according to claim 1, wherein the heat exchange fluid comprises multiple phases, only one of which undergoes no phase change in the process.

15. The process according to claim 4, wherein the heat exchange fluid is steam.

16. The process according to claim 4, wherein the catalyst is disposed on a porous support.

17. The process according to claim 4, wherein the temperature of each gas stream is controlled by heat exchange fluid flowing through the heat exchange channels of the reactor.

18. A process according to claim 4, wherein in step x) the temperature of the catalyst bed, of the reactor and/or of the oxidising gas stream is raised to a temperature of 250° C. to 325° C. at which the catalyst is fully oxidized.

19. A process according to claim 4, wherein in step y) the temperature of the reducing gas stream is raised to a holding temperature of 300° C. to 400° C. and kept at or near that holding temperature for a period of one hour to 24 hours.

20. A Fischer-Tropsch process comprising reacting a gas mixture comprising carbon monoxide and hydrogen in a Fischer-Tropsch reactor and periodically regenerating the catalyst in that Fischer-Tropsch reactor by a process according to claim 4.

21. A process according to claim 4, wherein the heat exchange fluid as a whole undergoes no phase change in the process.

22. A process according to claim 4, wherein the heat exchange fluid comprises multiple phases, only one of which undergoes no phase change in the process.

* * * * *